(12) United States Patent
Nudo (10) Patent No.: US 10,794,146 B2
(45) Date of Patent: Oct. 6, 2020

(54) DOWNHOLE VALVE ASSEMBLY HAVING AN INTEGRATED J-SLOT

(71) Applicant: Nicholas Joseph Nudo, Houston, TX (US)

(72) Inventor: Nicholas Joseph Nudo, Houston, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 174 days.

(21) Appl. No.: 15/923,626

(22) Filed: Mar. 16, 2018

(65) Prior Publication Data

US 2019/0284902 A1  Sep. 19, 2019

(51) Int. Cl.
| | | |
|---|---|---|
| *E21B 34/10* | (2006.01) | |
| *F16K 31/12* | (2006.01) | |
| *F16K 3/26* | (2006.01) | |
| *E21B 23/00* | (2006.01) | |

(52) U.S. Cl.
CPC ............ *E21B 34/10* (2013.01); *E21B 23/006* (2013.01); *F16K 3/26* (2013.01); *F16K 31/12* (2013.01); *E21B 2200/06* (2020.05)

(58) Field of Classification Search
CPC .. E21B 34/10; E21B 23/006; E21B 2034/007; F16K 3/26; F16K 3/262; F16K 3/265; F16K 31/12; F16K 31/5286
See application file for complete search history.

(56) References Cited

U.S. PATENT DOCUMENTS

| | | | |
|---|---|---|---|
| 4,524,831 A | 6/1985 | Pringle | |
| 5,609,178 A * | 3/1997 | Hennig | E21B 23/006 137/10 |
| 6,095,249 A * | 8/2000 | McGarian | E21B 21/002 166/319 |
| 6,889,771 B1 | 5/2005 | Leising et al. | |
| 7,059,401 B2 * | 6/2006 | Bode | E21B 23/006 166/233 |

(Continued)

FOREIGN PATENT DOCUMENTS

WO    2012112271 A1    8/2012

OTHER PUBLICATIONS

International Search Report and Written Opinion for International Application No. PCT/US2019/018172; International Filing Date Feb. 15, 2019; Report dated Jun. 5, 2019 (pp. 1-12).

*Primary Examiner* — Blake E Michener
(74) *Attorney, Agent, or Firm* — Cantor Colburn LLP (57) ABSTRACT

A valve assembly including a tubular having a first end, a second end, and an intermediate portion extending therebetween. The second end includes one or more openings. A pin member extends radially outwardly of the intermediate portion of the tubular. A valve member is arranged about the tubular. The valve member includes a first end portion, a second end portion and an intermediate section extending therebetween. The second end portion includes a valve element that registers with the one or more openings. An actuator sleeve is mounted to the first end of the valve member and extends about the tubular. The actuator sleeve includes a first end section, a second end section, and an inner surface extending therebetween. The inner surface includes a plurality of J-slots that are selectively receptive of the pin member to establish a position of the valve element relative to the one or more openings.

10 Claims, 7 Drawing Sheets

(56) References Cited

U.S. PATENT DOCUMENTS

| | | | |
|---|---|---|---|
| 9,664,015 B2 | 5/2017 | Hofman et al. | |
| 2002/0157837 A1* | 10/2002 | Bode | E21B 23/006 166/373 |
| 2004/0007356 A1 | 1/2004 | Myron | |
| 2014/0345705 A1* | 11/2014 | Grande | E21B 23/006 137/68.17 |
| 2015/0337628 A1* | 11/2015 | Johnson | E21B 43/12 166/386 |
| 2017/0183931 A1 | 6/2017 | Jani | |

* cited by examiner

DOWNHOLE VALVE ASSEMBLY HAVING AN INTEGRATED J-SLOT

BACKGROUND

In the resource exploration and recovery industry, boreholes may be formed in a resource bearing formation. A casing may be extended into the resource bearing formation. A tubular may then be extended into the casing. The resource bearing formation may include various zones of interest. Seals or packers may be deployed from the tubular outwardly against the casing to isolate one zone of interest from another. At this point, the casing may be selectively perforated in order to introduce fluids from the tubular into the formation or vice-versa.

Treatment fluids may flow into the formation through valves provided in the tubular. Similarly, valves may be selectively positioned to allow formation fluids to pass into the tubular from the formation. There are various actuation mechanisms for operating downhole valves. One system involves the use of a pin and j-slot assembly. The pin and j-slot assembly relies on the use of multiple separate and distinct components including a j-sleeve and a bearing sleeve internal to a valve's housing to provide a j-slot track that facilitates movement between valve positions. The multiple separate and distinct components add to an overall cost and complexity of the actuation mechanism. The art would be appreciative of an actuation mechanism that relies on fewer components.

SUMMARY

Disclosed is a valve assembly including a tubular having a first end, a second end, and an intermediate portion extending therebetween. The second end includes one or more openings. A pin member extends radially outwardly of the intermediate portion of the tubular. A valve member is arranged about the tubular. The valve member includes a first end portion, a second end portion and an intermediate section extending therebetween. The second end portion includes a valve element that registers with the one or more openings. An actuator sleeve is mounted to the first end of the valve member and extends about the tubular. The actuator sleeve includes a first end section, a second end section, and an inner surface extending therebetween. The inner surface includes a plurality of J-slots that are selectively receptive of the pin member to establish a position of the valve element relative to the one or more openings.

Also disclosed is a resource exploration and recovery system including a first system, and a second system including a tubular string extending into a formation. The tubular string includes a valve assembly including a tubular having a first end, a second end, and an intermediate portion extending therebetween. The second end includes one or more openings. A pin member extends radially outwardly of the intermediate portion of the tubular. A valve member is arranged about the tubular. The valve member includes a first end portion, a second end portion and an intermediate section extending therebetween. The second end portion includes a valve element that registers with the one or more openings. An actuator sleeve is mounted to the first end of the valve member and extends about the tubular. The actuator sleeve includes a first end section, a second end section, and an inner surface extending therebetween. The inner surface includes a plurality of J-slots that are selectively receptive of the pin member to establish a position of the valve element relative to the one or more openings.

Further disclosed is a method of operating a valve assembly including introducing an actuation force into a valve member having a valve element including valve openings, shifting a tubular including one or more openings relative to the valve member with the actuation force, guiding a pin member projecting radially outwardly of the tubular along one of a plurality of J-slots formed in an inner surface of an actuator sleeve connected to the valve member, and seating the pin member at a terminal end portion of the one of the plurality of J-slots to selectively align a portion of the one or more openings with the corresponding ones of the valve openings of the valve element.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
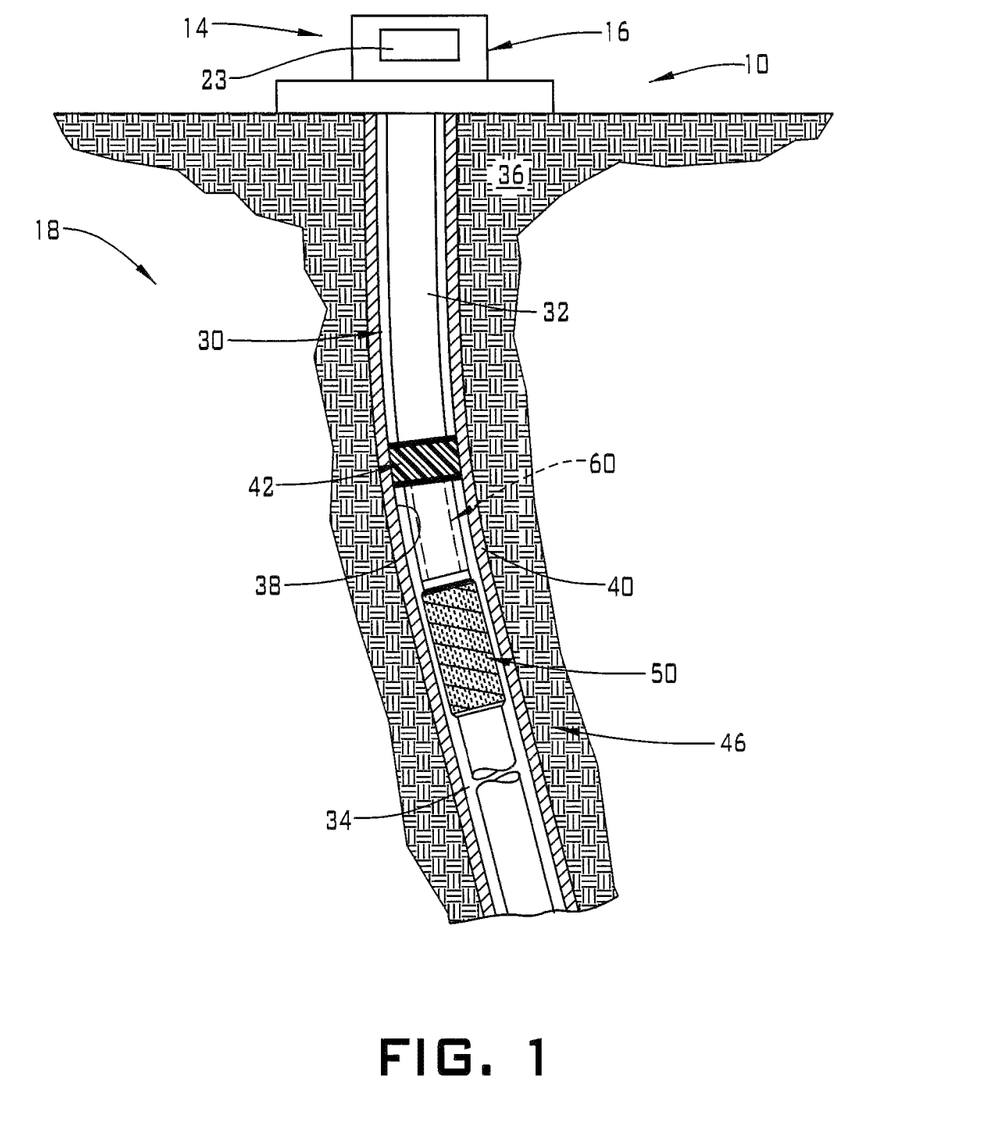
FIG. 1 depicts a resource exploration and recovery system including a downhole valve assembly having an integrated J-slot, in accordance with an exemplary aspect.

A resource exploration and recovery system, in accordance with an exemplary embodiment, is indicated generally at 10, in FIG. 1. Resource exploration and recovery system 10 should be understood to include well drilling operations, resource extraction and recovery, $CO_2$ sequestration, and the like. Resource exploration and recovery system 10 may include a first system 14 which, in some environments, may take the form of a surface system 16 operatively and fluidically connected to a second system 18 which, in some environments, may take the form of a downhole system. First system 14 may include a control system 23 that may provide power to, monitor, communicate with, and/or activate one or more downhole operations as will be discussed herein. Surface system 16 may include additional systems such as pumps, fluid storage systems, cranes and the like (not shown).

Second system 18 may include a tubular string 30, formed from one or more tubulars 32, which extends into a wellbore 34 formed in formation 36. Wellbore 34 includes an annular wall 38 which may be defined by a surface of formation 36, or a casing tubular 40 such as shown. Tubular string 32 may support a plurality of packer assemblies, one of which is indicated at 42 that separate wellbore 34 into a plurality of production and/or treatment zones 46. One or more screen assemblies 50 may be arranged in each production and/or treatment zone 46.

Figure 2:
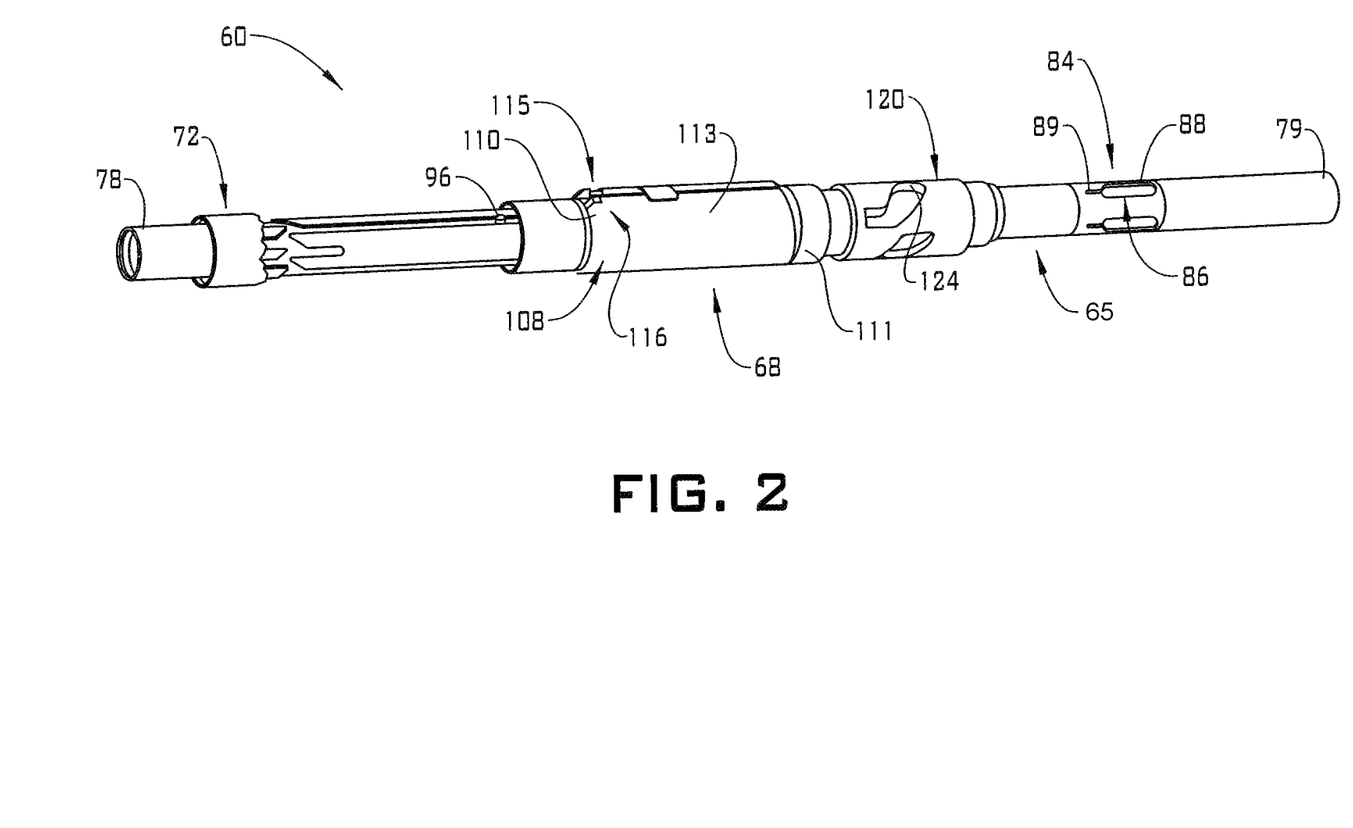
FIG. 2 depicts a partially cut-away view of the downhole valve assembly, in accordance with an exemplary aspect.

In an embodiment, tubular string 32 supports a valve assembly 60 positioned in production and/or treatment zone 46. Valve assembly 60 may be selectively to permit a flow of fluids from tubular string 30 into formation 36 and or production fluids from formation 36 into tubular string 30. As shown in FIG. 2, valve assembly 60 includes a first or inner tubular 65, a valve member 68 extending about tubular 65 and an actuator sleeve 72 connected to valve member 68. As will be detailed herein, an actuation force, which may take the form of a hydraulic pulse, is introduced into valve member 68. The hydraulic pulse shifts tubular 65 relative to valve member 68 and actuator sleeve 72 to establish a selected choke or valve position.

Figure 3:
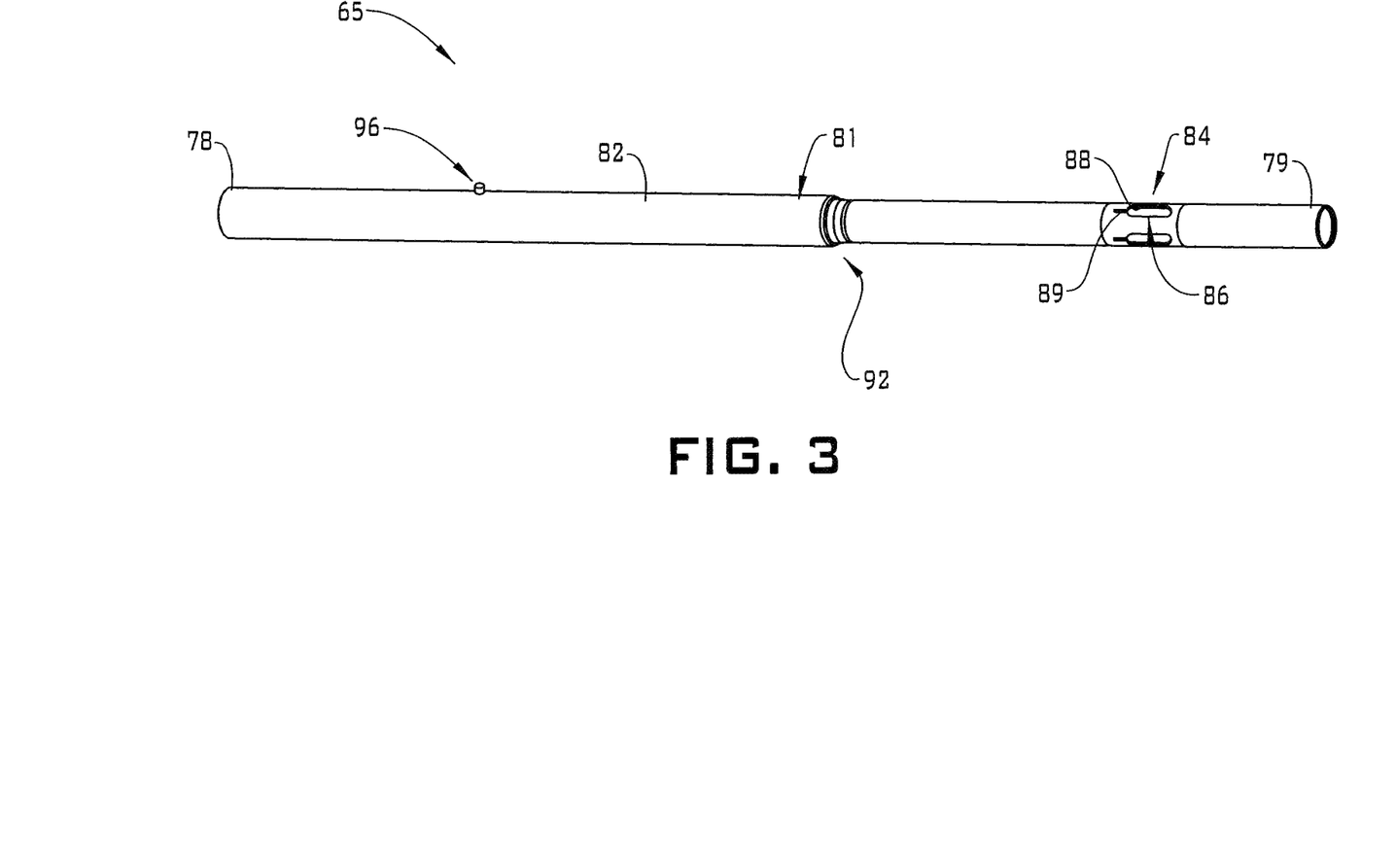
FIG. 3 depicts an inner tubular of the downhole valve assembly of FIG. 2.

Referring to FIG. 3 and with continued reference to FIG. 2, tubular 65 includes a first end 78, a second end 79 and an intermediate portion 81, defining, in part, an outer surface 82 extending therebetween. A plurality of openings, one of which is shown at 84, is provided on intermediate portion 81 proximate to second end 79. Openings 84 take the form of slots 86 having a first portion 88 and a second portion 89. Second portion 89 includes a width that is less than a width of first portion 88. A piston element 92 is arranged on intermediate portion 81 between first end 78 and second end 79. A pin member 96 extends radially outwardly of outer surface 82 between first end 78 and piston element 92.

In further accordance with an exemplary embodiment, valve member 68 includes a body 108 having a first end portion 110, a second end portion 111 and an intermediate section 113 extending therebetween. A first port 115 is arranged proximate to first end portion 110 and a second port 116 is also arranged proximate to first end portion 110 adjacent to first port 115. First and second ports 115 and 116 are receptive to an actuation force that is applied to shift tubular 65 axially relative to valve member 68. It should however be understood that other mechanisms, such as mechanical elements, may be employed to shift tubular 65 relative to valve member 68. Valve member 68 supports a valve element 120 at second end portion 111. Valve element 120 includes a plurality of windows 124 that are selectively aligned with openings 84 in tubular 65 as will be described herein.

Figure 4:
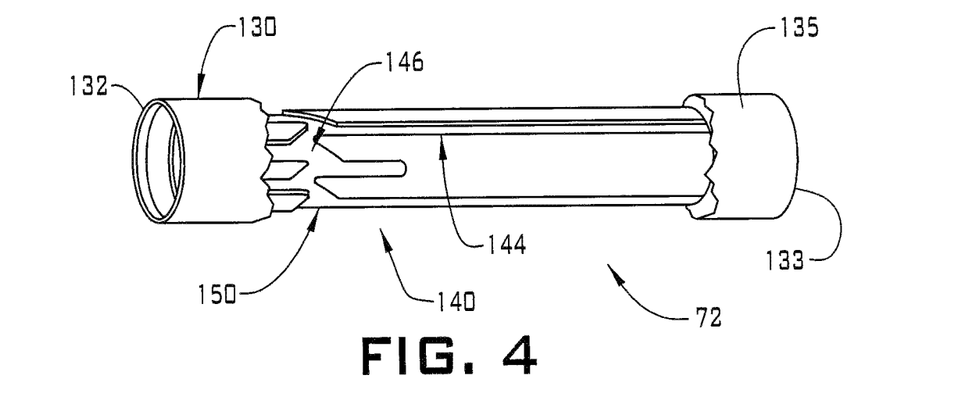
FIG. 4 is a partially cut-away, partially cross-sectional view of a J-slot sleeve of the downhole valve assembly of FIG. 2.
Figure 5:
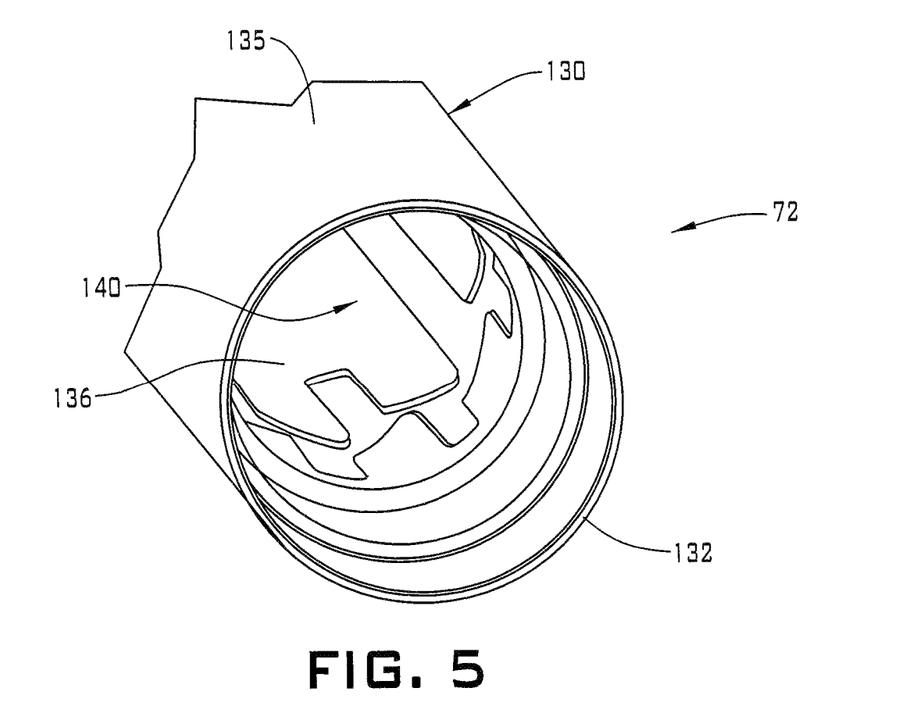
FIG. 5 depicts an inner surface of the J-slot sleeve of FIG. 4.

In still further accordance with an exemplary embodiment depicted in FIGS. 4 and 5 and with continued reference to FIGS. 2-3, actuator sleeve 72 includes a body portion 130 having a first end section 132, a second end section 133, an outer surface 135 and an inner surface 136. A plurality of J-slots 140 is formed in inner surface 136. Plurality of J-slots 140 are receptive of pin member 96 and cooperate to selectively position tubular 65 relative to valve element 120.

In an embodiment, plurality of J-slots 140 include a first plurality of J-slot members 144 that extend axially along inner surface 136 toward second end section 133 and a second plurality of J-slot members 146 that extend axially along inner surface 136 toward first end section 132. In accordance with an exemplary aspect, each of the first plurality of J-slot members may include a length that is distinct from others of the first plurality of J-slot members. First plurality of J-slot members 144 are spaced from second plurality of J-slot members 146 by an interruption zone 150. Interruption zone 150 provides a passage that enables pin member 96 to travel between each of the plurality of J-slots 140.

Figure 6A:
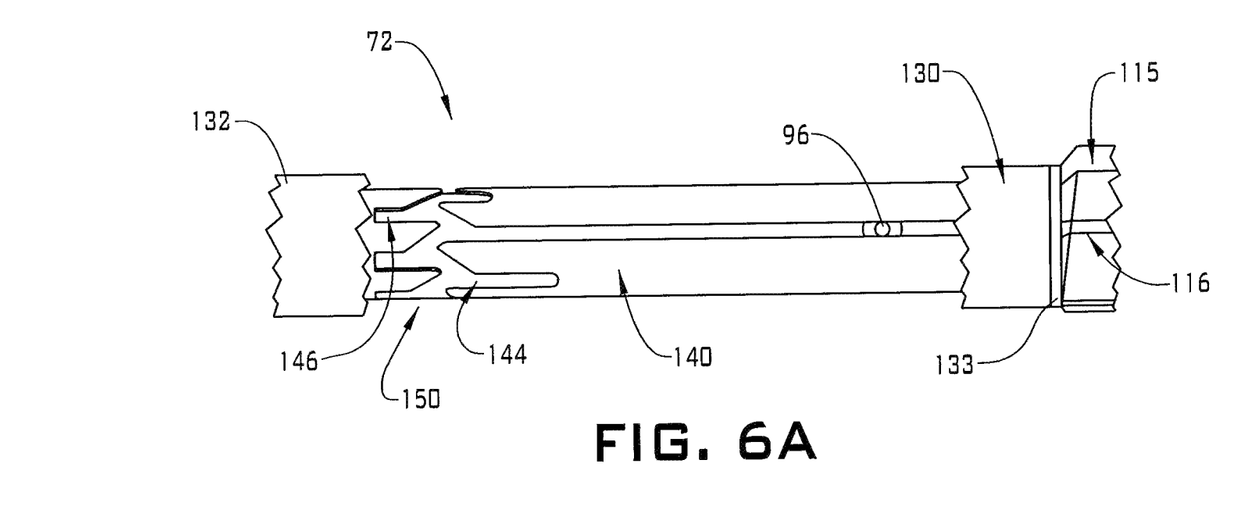
FIG. 6A depicts an actuator end portion of the downhole valve assembly in a first position, in accordance with an exemplary aspect.
Figure 6B:
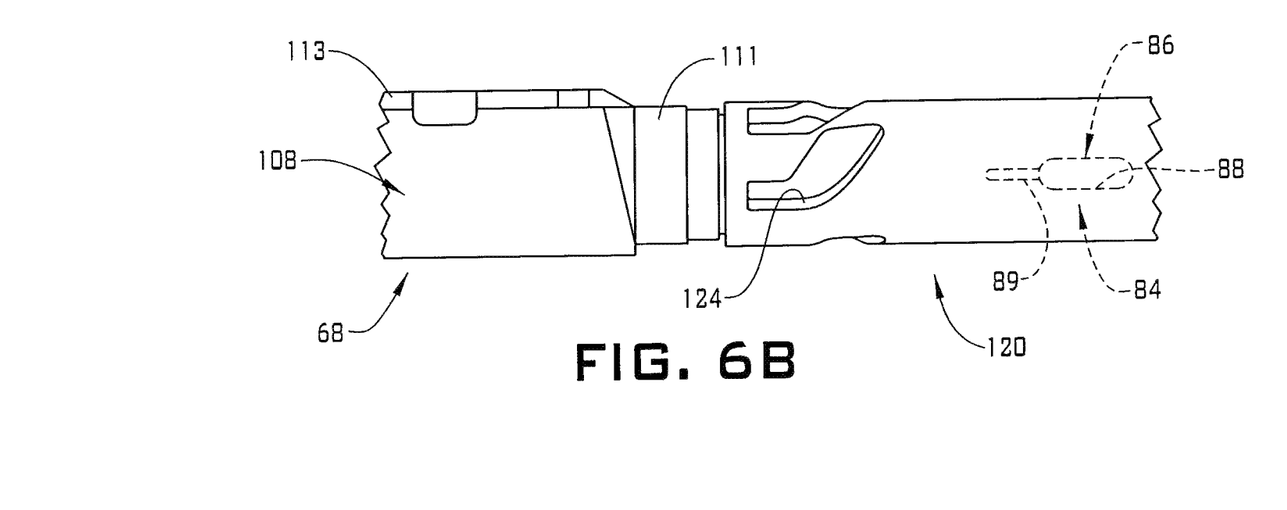
FIG. 6B depicts a valve end portion of the downhole valve assembly of FIG. 6A illustrating a valve member in the first position.

Reference will now follow to FIGS. 6A-8B in describing a method of operative valve assembly 60 in accordance with an exemplary embodiment. Valve assembly 60 may be in a closed of fully choked configuration such as shown in FIGS. 6A and 6B. An actuation force, such as a pulse of hydraulic fluid, may be introduced into second port 116 causing tubular 65 to axially transition in a first direction. Axial translation of tubular 65 causes pin member 96 to translate along one of the first plurality of J-slot members 144 towards one of the second plurality of J-slot members 146. Pin member 96 engages an angled surface (not separately labeled) of the one of the second plurality of J-slot members 146 causing tubular 65 to partially rotate. Pin member 96 may then enter into one of the second plurality of J-slot members.

Figure 7A:
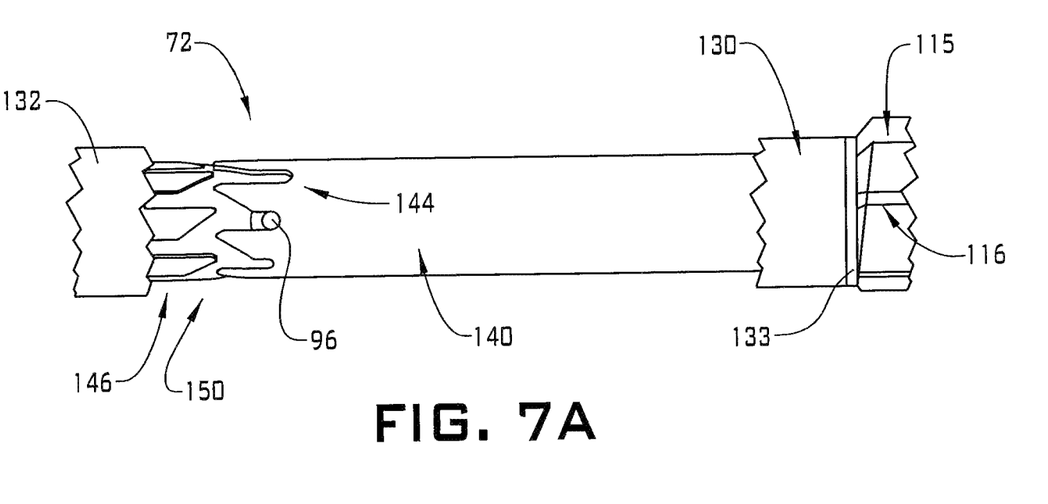
FIG. 7A depicts an actuator end portion of the downhole valve assembly in a second position, in accordance with an exemplary aspect.
Figure 7B:
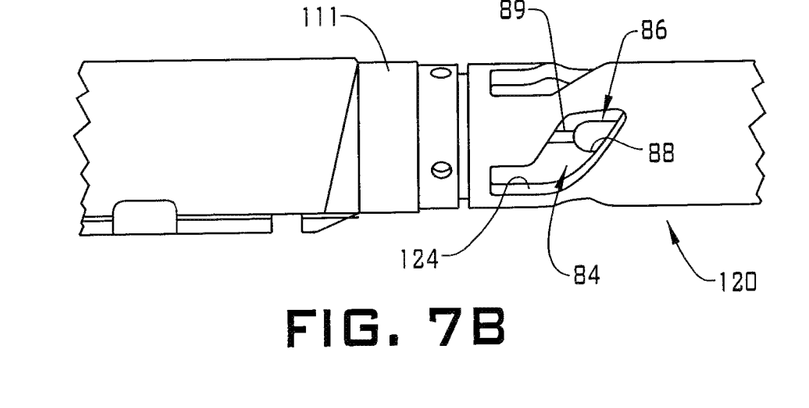
FIG. 7B depicts a valve end portion of the downhole valve assembly of FIG. 7A, illustrating a valve member in the second position.
Figure 8A:
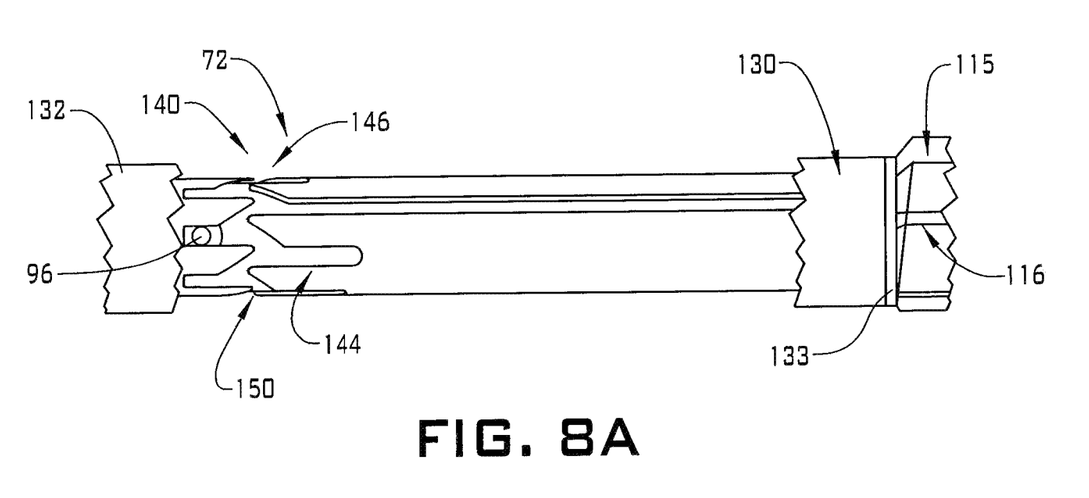
FIG. 8A depicts an actuator end portion of the downhole valve assembly in a third position, in accordance with an exemplary aspect.
Figure 8B:
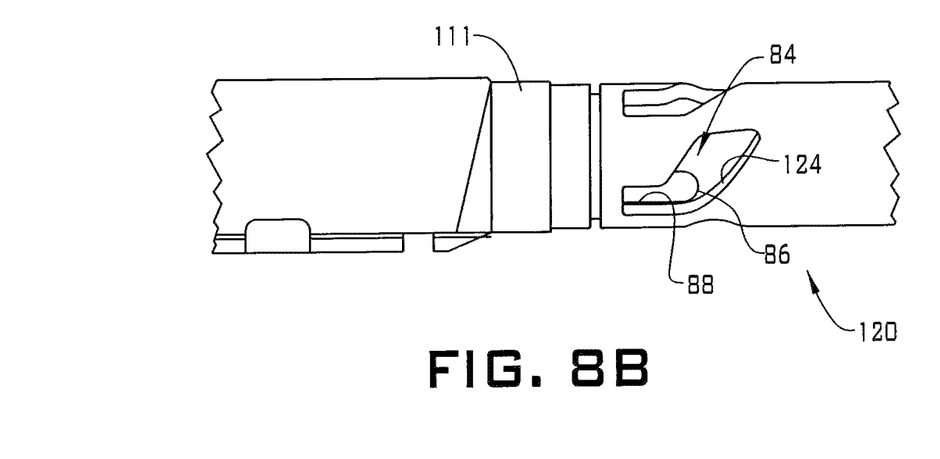
FIG. 8B depicts a valve end portion of the downhole valve assembly of FIG. 8A illustrating a valve member in the third position.

At this point, another actuation force may be applied to first port 115 causing tubular 65 to axially translate in a second direction causing pin member 96 to enter into another one of the first plurality of J-slot members 144. In this position, a portion of openings 84 may align with a corresponding windows 124 placing valve assembly 60 in a partially open or choked position such as shown in FIGS. 7A and 7B. Additional applications of the actuation force may cause tubular 65 to translate through additional ones of the first and second pluralities of J-slot members 144 and 146 to a fully open or un-choked configuration such as shown in FIGS. 8A and 8B. Further, it should be understood that each of the first and second pluralities of J-slot members 144 and 146 may correspond to different opening or choked configurations of valve assembly 60.

It should be understood that by forming J-slots on an inner surface of the actuator sleeve and by providing the pin member on an outer surface of the inner tubular, an overall construction of the valve assembly in accordance with exemplary embodiments may be simplified. Simplifying the construction of the valve assembly leads to cost savings, as well as reduced maintenance issues. The fewer the components equates to fewer opportunities for components to fail leading to increased performance over an operational life-cycle of the valve assembly.

Set forth below are some embodiments of the foregoing disclosure:

Embodiment 1

A valve assembly Including a tubular including a first end, a second end, and an intermediate portion extending therebetween, the second end including one or more openings, a pin member extending radially outwardly of the intermediate portion of the tubular, a valve member arranged about the tubular, the valve member including a first end portion, a second end portion and an intermediate section extending therebetween, the second end portion including a valve element that registers with the one or more openings, and an actuator sleeve mounted to the first end of the valve member and extending about the tubular, the actuator sleeve including a first end section, a second end section, and an inner surface extending therebetween, the inner surface including a plurality of J-slots that are selectively receptive of the pin member to establish a position of the valve element relative to the one or more openings.

Embodiment 2

The valve assembly according to any prior embodiment, further comprising: a piston element formed on the intermediate portion of the tubular.

Embodiment 3

The valve assembly according to any prior embodiment, wherein the valve member includes a first port arranged at the first end portion and a second port arranged at the first end portion, the piston element being disposed between the first end portion and the second end portion.

Embodiment 4

The valve assembly according to any prior embodiment, wherein the plurality of J-slots includes a first plurality of J-slot members extending toward the second end section and a second plurality of J-slot members extending toward the first end section.

Embodiment 5

The valve assembly according to any prior embodiment, wherein each of the first plurality of J-slot members include a length that is distinct from others of the plurality of J-slot members.

Embodiment 6

The valve assembly according to any prior embodiment, wherein the plurality of J-slots are integrally formed in the inner surface.

Embodiment 7

A resource exploration and recovery system including a first system, a second system including a tubular string extending into a formation, the tubular string including a valve assembly including a tubular including a first end, a second end, and an intermediate portion extending therebetween, the second end including one or more openings, a pin member extending radially outwardly of the intermediate portion of the tubular, a valve member arranged about the tubular, the valve member including a first end portion, a second end portion and an intermediate section extending therebetween, the second end portion including a valve element that registers with the one or more openings, and an actuator sleeve mounted to the first end of the valve member and extending about the tubular, the actuator sleeve including a first end section, a second end section, and an inner surface extending therebetween, the inner surface including a plurality of J-slots that are selectively receptive of the pin member to establish a position of the valve element relative to the one or more openings.

Embodiment 8

The resource exploration and recovery system according to any prior embodiment, further comprising: a piston element formed on the intermediate portion of the tubular.

Embodiment 9

The resource exploration and recovery system according to any prior embodiment, wherein the valve member includes a first port arranged at the first end portion and a second port arranged at the first end portion, the piston element being disposed between the first end portion and the second end portion.

Embodiment 10

The resource exploration and recovery system according to any prior embodiment, wherein the plurality of J-slots includes a first plurality of J-slot members extending toward the first end section and a second plurality of J-slot members extending toward the second end section.

Embodiment 11

The resource exploration and recovery system according to any prior embodiment, wherein each of the first plurality of J-slot members includes a length that is distinct from others of the first plurality of J-slot members.

Embodiment 12

The resource exploration and recovery system according to any prior embodiment, wherein the plurality of J-slots are integrally formed in the inner surface.

Embodiment 13

A method of operating a valve assembly including introducing an actuation force into a valve member having a valve element including valve openings, shifting a tubular including one or more openings relative to the valve member with the actuation force, guiding a pin member projecting radially outwardly of the tubular along one of a plurality of J-slots formed in an inner surface of an actuator sleeve connected to the valve member, and seating the pin member at a terminal end portion of the one of the plurality of J-slots to selectively align a portion of the one or more openings with the corresponding ones of the valve openings of the valve element.

Embodiment 14

The method of any prior embodiment, wherein introducing the actuation force includes applying a hydraulic pressure to the tubular through the valve member.

Embodiment 15

The method of any prior embodiment, wherein seating the pin member at the terminal end portion of the one of the plurality of J-slots establishes a selected choke setting for the valve assembly.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A valve assembly comprising:
   a tubular including a first end, a second end, and an intermediate portion extending therebetween, the second end including one or more openings;
   a piston element extending annularly about the intermediate portion of the tubular, the piston element being responsive to hydraulic pressure to shift the tubular axially within the valve assembly;
   a pin member extending radially outwardly of the intermediate portion of the tubular between the first end and the piston element;
   a valve member arranged about the tubular, the valve member including a first end portion, a second end portion and an intermediate section extending therebetween, the valve member including a first fluid port and a second fluid port arranged at the first end portion, the second end portion including a valve element that registers with the one or more openings; and
   an actuator sleeve mounted to the first end of the valve member and extending about the tubular, the actuator sleeve including a first end section, a second end section, and an inner surface extending therebetween, the inner surface including a plurality of J-slots that are selectively receptive of the pin member to establish a position of the valve element relative to the one or more openings.

2. The valve assembly according to claim 1, wherein the plurality of J-slots includes a first plurality of J-slot members extending toward the second end section and a second plurality of J-slot members extending toward the first end section.

3. The valve assembly according to claim 2, wherein each of the first plurality of J-slot members include a length that is distinct from others of the first plurality of J-slot members.

4. The valve assembly according to claim 1, wherein the plurality of J-slots are integrally formed in the inner surface.

5. A resource exploration and recovery system comprising:
   a first system;
   a second system including a tubular string extending into a formation, the tubular string including a tubular having a first end, a second end, and an intermediate portion extending therebetween, the second end including one or more openings, the tubular including a valve assembly comprising:
   a piston element extending annularly about the intermediate portion of the tubular, the piston element being responsive to hydraulic pressure to shift the tubular axially within the valve assembly;
   a pin member extending radially outwardly of the intermediate portion of the tubular between the first end and the piston element;
   a valve member arranged about the tubular, the valve member including a first end portion, a second end portion and an intermediate section extending therebetween, the valve member including a first fluid port and a second fluid port arranged at the first end portion, the second end portion including a valve element that registers with the one or more openings;; and
   an actuator sleeve mounted to the first end of the valve member and extending about the tubular, the actuator sleeve including a first end section, a second end section, and an inner surface extending therebetween, the inner surface including a plurality of J-slots that are selectively receptive of the pin member to establish a position of the valve element relative to the one or more openings.

6. The resource exploration and recovery system according to claim 5, wherein the plurality of J-slots includes a first plurality of J-slot members extending toward the first end section and a second plurality of J-slot members extending toward the second end section.

7. The resource exploration and recovery system according to claim 6, wherein each of the first plurality of J-slot members includes a length that is distinct from others of the first plurality of J-slot members.

8. The resource exploration and recovery system according to claim 5, wherein the plurality of J-slots are integrally formed in the inner surface.

9. A method of operating a valve assembly comprising:
   introducing an actuation force into a valve member having a valve element including valve openings by directing a hydraulic fluid into first and second ports provided on the valve member;
   engaging a piston element extending annularly about a tubular with the actuation force;
   shifting the tubular including one or more openings relative to the valve member with the actuation force;
   guiding a pin member projecting radially outwardly of the tubular along one of a plurality of J-slots formed in an inner surface of an actuator sleeve connected to the valve member; and
   seating the pin member at a terminal end portion of the one of the plurality of J-slots to selectively align a portion of the one or more openings with corresponding ones of the valve openings of the valve element.

10. The method of claim 9, wherein seating the pin member at the terminal end portion of the one of the plurality of J-slots establishes a selected choke setting for the valve assembly.

\* \* \* \* \*